(12) United States Patent
Haberer et al.

(10) Patent No.: US 11,030,565 B1
(45) Date of Patent: Jun. 8, 2021

(54) SYSTEM AND METHOD FOR AUDIT REPORT GENERATION FROM STRUCTURED DATA

(71) Applicant: GRANT THORNTON LLP, Chicago, IL (US)

(72) Inventors: Gregory Haberer, Chicago, IL (US); Wes Luckock, Chicago, IL (US); Ethan Rojhani, Chicago, IL (US)

(73) Assignee: Grant Thornton LLP, Chicago, IL (US)

( * ) Notice: Subject to any disclaimer, the term of this patent is extended or adjusted under 35 U.S.C. 154(b) by 0 days.

(21) Appl. No.: 16/876,638

(22) Filed: May 18, 2020

(51) Int. Cl.
*G06Q 10/00* (2012.01)
*G06F 16/20* (2019.01)
*G06F 21/40* (2013.01)
*G06F 11/30* (2006.01)
*G06F 8/40* (2018.01)
*G06Q 10/06* (2012.01)
*G06F 16/25* (2019.01)
*G06F 21/46* (2013.01)
*G06F 11/36* (2006.01)
*G06F 16/21* (2019.01)
*G06F 8/41* (2018.01)

(52) U.S. Cl.
CPC ......... *G06Q 10/06395* (2013.01); *G06F 8/41* (2013.01); *G06F 11/3672* (2013.01); *G06F 16/21* (2019.01); *G06F 16/258* (2019.01); *G06F 21/46* (2013.01)

(58) Field of Classification Search
USPC ..................................................... 705/7.41
See application file for complete search history.

(56) References Cited

U.S. PATENT DOCUMENTS 7,873,560 B2   1/2011   Reich et al.
8,561,175 B2   10/2013  Williams et al.
8,694,347 B2   4/2014   Kennis et al.
(Continued)

OTHER PUBLICATIONS

Pongsrisomchai et al., Automated IT Audit of Windows Server Access Control, May 2, 2019, IEEE (Year: 2019).*

*Primary Examiner* — Brian M Epstein
*Assistant Examiner* — Allison M Neal
(74) *Attorney, Agent, or Firm* — Faegre Drinker Biddle & Reath LLP (57) ABSTRACT

A method and system for generating an audit report is described. Structured data that represents a prior performance of a business process is received at a processor from a staging database configured to receive raw data from a plurality of distinct data sources. Test control functions are selected by the processor from a plurality of predetermined test control functions. The plurality of predetermined test control functions are configured to read structured data from the staging database and to process the structured data to determine whether business processes have been properly performed. The selected one or more test control functions are executed by the processor to determine whether the business process has been properly performed using the received structured data. The audit report is generated by the processor to include the determination by the selected one or more test control functions of whether the business process has been properly performed.

18 Claims, 3 Drawing Sheets

(56) References Cited

U.S. PATENT DOCUMENTS

| | | | |
|---|---|---|---|
| 2005/0065865 A1* | 3/2005 | Salomon | G06Q 40/00 |
| | | | 705/35 |
| 2008/0086499 A1* | 4/2008 | Wefers | G06Q 10/10 |
| 2010/0305978 A1* | 12/2010 | Hogan | G06Q 40/08 |
| | | | 705/4 |
| 2017/0099278 A1* | 4/2017 | Ducatel | H04L 63/08 |
| 2018/0329904 A1* | 11/2018 | Gupta | G01M 5/0091 |
| 2018/0375886 A1* | 12/2018 | Kirti | H04L 63/1416 |
| 2020/0175076 A1* | 6/2020 | Powers | G06Q 50/01 |

\* cited by examiner

SYSTEM AND METHOD FOR AUDIT REPORT GENERATION FROM STRUCTURED DATA

FIELD OF THE DISCLOSURE

The present disclosure relates generally to verification of business procedures and, more particularly, to improved performance of automated audit routines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today's business leaders are looking to reduce risk and enhance efficiencies that allow them to focus more time on creating value for the business. For every hour spent by an outside auditor to analyze a business for verification of business procedures, personnel at the business may spend eight to twelve hours in preparing the data that the outside auditor utilizes for the audit. In some scenarios, audits for Sarbanes-Oxley compliance may add up to 15% overhead to finance personnel and information technology staff to a company that wishes to be "SOX" compliant. Testing still consumes more than 50% of an internal auditor's time, but the value of an internal auditor is not always apparent until a problem is discovered, so budgets provided for an internal auditor may be reduced when no problems are found, leading to a reduction in testing. Although sample testing using a subset of available data may provide reasonable assurance, it cannot provide full confidence to the business. Although some automation of testing may be performed by an internal auditor by using custom-developed test routines, the investment of funds and expertise to implement these customized solutions is not always available.

SUMMARY

In an embodiment, a method for generating an audit report includes: receiving, at a processor and from a staging database, structured data that represents a prior performance of a business process, the staging database being configured to receive raw data from a plurality of distinct data sources; selecting, by the processor, one or more test control functions from a plurality of predetermined test control functions, the plurality of predetermined test control functions being configured to read structured data from the staging database and to process the structured data to determine whether business processes have been properly performed; executing, by the processor, the selected one or more test control functions to determine whether the business process has been properly performed using the received structured data; and generating, by the processor, the audit report to include the determination by the selected one or more test control functions of whether the business process has been properly performed.

In another embodiment, a system for generation of an audit report comprises a staging database configured to receive raw data from a plurality of distinct data sources and one or more processors. The one or more processors are configured to execute a structured data processing application configured to: receive, at the one or more processors and from the staging database, structured data that represents a prior performance of a business process; select, by the one or more processors, one or more test control functions from a plurality of predetermined test control functions, the plurality of predetermined test control functions being configured to read structured data from the staging database and to process the structured data to determine whether business processes have been properly performed; execute, by the one or more processors, the selected one or more test control functions to determine whether the business process has been properly performed using the received structured data; and generate, by the one or more processors, the audit report to include the determination by the selected one or more test control functions of whether the business process has been properly performed.

DETAILED DESCRIPTION

The present disclosure relates to an audit system configured to provide continuous monitoring and reporting of internal business process performance, for example, for compliance with Sarbanes-Oxley or other industry or government regulations. The audit system helps to automate the manual testing process for information technology and business process related controls, allowing for improved reliability of financial reporting, improved effectiveness of business operations, and verified compliance with applicable laws and regulation. The audit system, in some embodiments, provides a library of predetermined test control functions that are configured to automate testing which would previously have been performed manually. Advantageously, the test control functions are reusable, at least in some scenarios, which improves efficiency of performing an audit and also the quality of that audit. Moreover, the automation provided by the audit system, in some embodiments, allows for more frequent and in some cases real-time testing of data.

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

Figure 1:
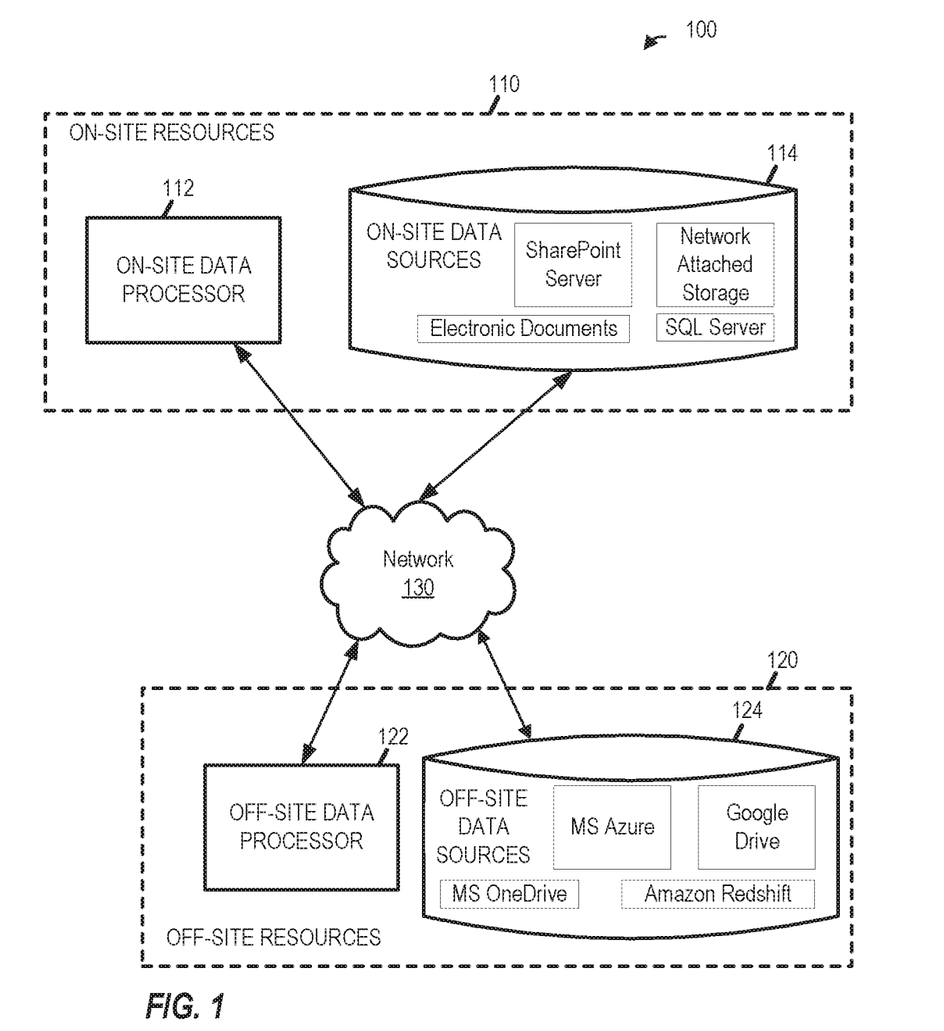
FIG. 1 is a block diagram of an example audit system configured to generate an audit report using structured data, according to an embodiment.

FIG. 1 is a block diagram of an example audit system 100 configured to generate an audit report using structured data, according to an embodiment. The audit report, in some scenarios, includes analysis of data representative of a prior performance of internal processes of a business for the purpose of assisting an auditor to i) find places for improvement in those internal processes, ii) identify processes that have not been adequately followed, iii) provide data for determining compliance of industry or government regulations (for example, the Sarbanes-Oxley Act, Securities and Exchange Commission, General Data Protection Regulation, California Consumer Privacy Act, etc.). Although the description herein is focused on a business, this is merely an example and in other embodiments, the business is a university, non-profit organization, governmental institution, or other suitable organization.

As described herein, the data may be "raw" data or "processed" data. Raw data is generally data that is utilized for the audit in its original format from its time of entry. As one example, raw data may be data that was directly entered into a spreadsheet by a user. As another example, raw data may include access log entries that are generated by a computer when a user logs in to the computer. As yet another example, raw data may be data that was written into a notebook by a user. Processed data is generally data that has been modified by another process, either by a user, software, or a suitable processing device. As one example, processed data may be data that has been scanned in, by a scanner, from the notebook written by the user. As another example, processed data may be a report that is generated from a database of log files.

The audit system 100, in various embodiments and/or scenarios, is configured to utilize a combination of on-site resources 110 and off-site resources 120, communicatively coupled by a communication network 130. The communication network 130 may be a wide area network (WAN) such as the Internet, a local area network (LAN), or any other suitable type of communication network. In some embodiments, the communication network 130 may be a single communication network or may be made up of multiple different communication networks (e.g., two or more LANs that are joined by the Internet).

A business that is performing an audit (or being assisted with an audit by a third party auditor) provides the on-site resources 110, including, for example, one or more on-site data processors 112 and one or more on-site data sources 114. Examples of an on-site data processor 112 include personal computers, network servers, server clusters, or other suitable processors that may be located at the business and utilized, at least in part, for processing data and generating an audit report (or a portion of the audit report). Examples of the on-site data source 114 include electronic documents (e.g., Word or text documents, spreadsheets, slides, etc.) that may be stored in a personal computer, network attached storage, or Microsoft SharePoint server for example, databases (e.g., Oracle, mySQL, DB2, etc.), application programming interfaces to proprietary software, or other suitable data sources. In some scenarios, the electronic documents are originally created as paper or hard-copy documents by a user (i.e., raw data) and are processed to be included in an electronic document, for example, by scanning, optical character recognition by a processor (e.g., processor 112 or 122), or a separate user that manually enters the data contained within the paper document. In some embodiments, one or more on-site data processors 112 and/or on-site data sources 114 are managed or provided by a third party auditor, but located on the premises of the business.

In some embodiments, a business may utilize a third party host that provides the off-site resources 120, including, for example, one or more off-site data processors 122 and one or more off-site data sources 124. Although the off-site resources 120 may also be utilized, at least in part, for processing data and generating an audit report (or a portion of the audit report), the off-site resources 120 are generally managed by the third party host, or several different third party hosts. Examples of the off-site data source 124 include Amazon Relational Database Service or Redshift, Drop Box, Google Drive, Microsoft Azure or OneDrive, remote data backup services, or an application programming interface (API) to a data source, such as Salesforce or Facebook. Examples of an off-site data processor 122 include personal computers, network servers, server clusters, cloud processors, distributed computing systems (e.g., Amazon Web Services, Microsoft Azure), or other suitable processors that are located remotely from the business.

In some embodiments, the third party host of at least some of the off-site resources 120 is also the third party auditor. In other words, the third party auditor provides off-site hosting of data that will be used for generating an audit report, off-site processing of data that will be used for generating the audit report, or both off-site hosting and off-site processing. As one example, a small business may rely on the third party auditor to host and process data to be used for an audit so that the business does not need to pay for potentially large amounts of data storage and processing power. As another example, a small business may rely on the third party auditor to perform processing of the data, but use its own data sources.

Figure 2:
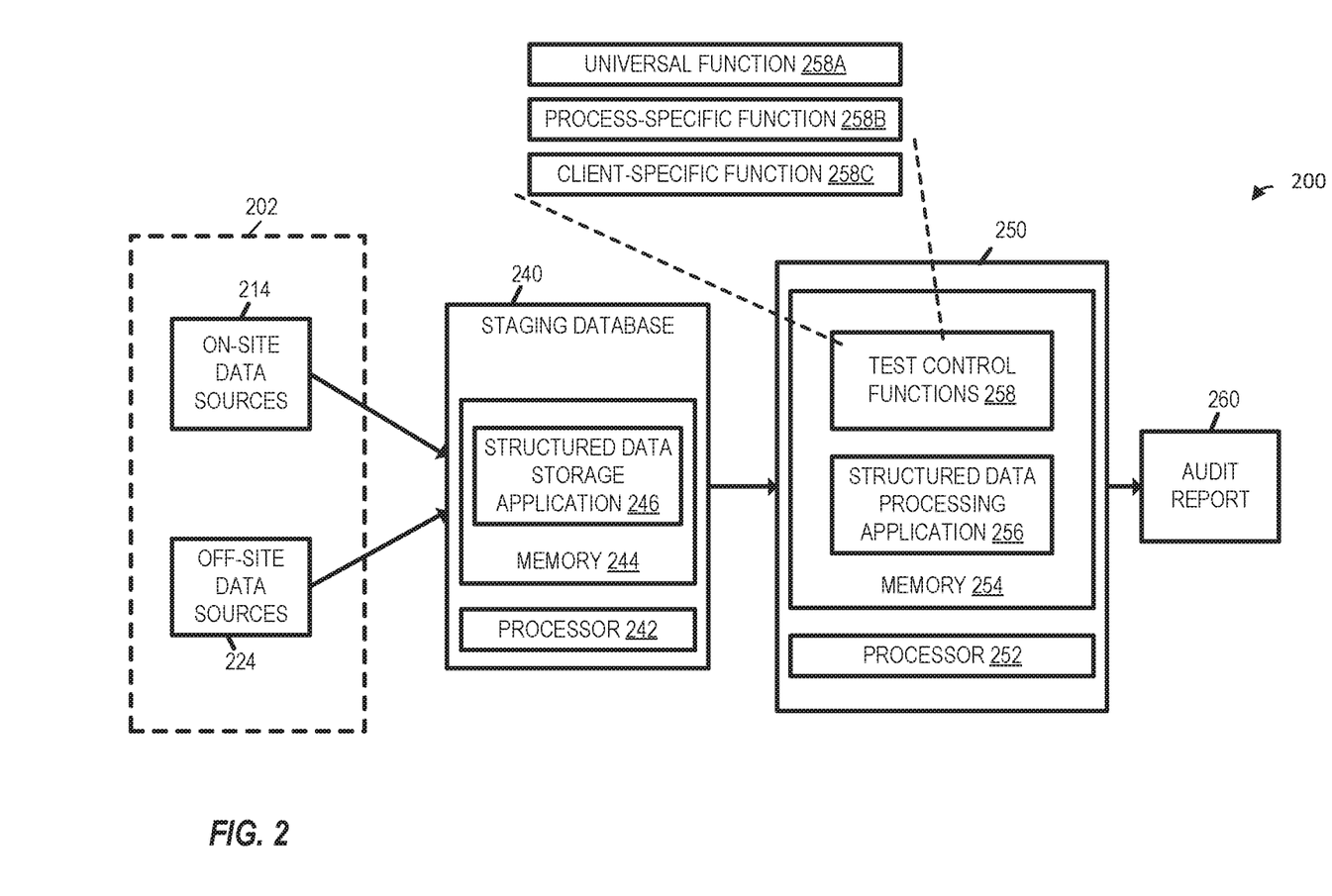
FIG. 2 is a block diagram of an example data flow illustrating generation of an audit report using the system of FIG. 1, according to an embodiment.

FIG. 2 is a block diagram of an example data flow 200 illustrating generation of an audit report 260 using the audit system 100 of FIG. 1, according to an embodiment. In the embodiment shown in FIG. 2, one or more data sources 202 provide data (i.e., raw data or processed data) to a staging database 240. The data sources 202 include one or more of the on-site data sources 114 (FIG. 1) and off-site data sources 124 (FIG. 1) and may store raw data and/or processed data.

The staging database 240 may include a processor 242 and a computer-readable memory 244 that stores a structured data storage application 246 in the form of computer-readable instructions, for example, that may be executable by the processor 242. Computer readable memory 244 may include volatile memory to store computer instructions and data on which the computer instructions operate at runtime (e.g., Random Access Memory or RAM) and, in an embodiment, persistent memory such as a solid state drive or disk drive, for example.

The staging database 240 (via execution of the structured data storage application 246) is configured to store data in the memory 244 as "structured" data until the structured data is processed by a test control function processor 250 for generation of the audit report 260, as described herein. Structured data is data having a predetermined format and, in some scenarios, the structured data includes data from multiple data sources that is stored together such that the data is retrievable with a single request. The test control function processor 250 includes a plurality of predetermined test control functions that are configured to read structured data from the staging database 240 and to process the structured data to determine whether business processes have been properly performed. In various embodiments, the test control functions are software functions, routines, scripts, or executable files that process structured data and provide a suitable output. The plurality of test control functions are "predetermined" in that they are configured to receive structured data having a predetermined format as function parameters or inputs. Accordingly, the predetermined test control functions are re-usable for multiple audits as long as the appropriate data has been stored in the staging database 240 in the appropriate format. In this way, audit efficiency is improved by using the same test control functions for different audits and even for different businesses, instead of recreating those test control functions for each business.

The staging database 240 is configured to receive data from the data sources 202 and store that data as "structured" data for subsequent processing by the test control function processor 250 and generation of the audit report 260. In various embodiments, the staging database 240 is implemented by the on-site data source 114, by the off-site data source 124, or both the on-site data source 114 and the off-site data source 124, for example, as a portion of an electronic document, one or more tables in a database, a portion or partition of a disk drive, or other suitable data storage device. In some embodiments, the staging database 240 also stores the structured data for backup and recovery purposes, follow-up audits, or other suitable purposes. In other embodiments, the staging database 240 is a cloud-based data storage and processing system, for example, Azure data storage and Azure Data Factory.

In some embodiments, the staging database 240 receives the data from the data sources 202 in response to a request transmitted from or on behalf of the staging database 240, such as a database query, file transfer query, or other suitable request. In some scenarios, the staging database 240 makes two or more separate calls or requests to distinct data sources of the data sources 202 to obtain separate data elements, but combines and stores those separate data elements as the structured data. In other embodiments, the data is sent by the data sources 202 without a request from the staging database 240. The staging database 240 receives data from some of the data sources 202 on a predetermined schedule, for example, every four hours, every day at 3:00 AM, or other suitable schedule, in an embodiment. Alternatively, or in addition to the predetermined schedule, some data sources 202 provide data to the staging database 240 in response to a local trigger, for example, when a log file reaches a predetermined size (e.g., 1024 entries in the log file, or the log file reaches one megabyte in size, etc.). In some scenarios, the staging database 240 sends a request to the data sources 202 for additional data based on a processing threshold, for example, when the staging database 240 is idle, when the test control function processor 250 is idle, etc.

As described above, staging database 240 is configured so that the structured data containing separate data elements is retrievable using only a single request (e.g., a database query). Accordingly, the staging database 240 provides improved storage of data that will be used for performing an audit analysis because routines that perform the analysis do not need to make calls to multiple data sources (i.e., the data sources 202) in order to obtain the required data. Additionally, data from data sources that contain similar data but in different formats can be effectively combined into a same format so that different routines for the different formats are not needed.

In some embodiments, the staging database 240 is configured to receive data from the data sources 202 and process the data to obtain and store the structured data. In an embodiment, for example, the staging database 240 is configured to perform data conversion or transformation routines, optical character recognition routines, sorting routines, filtering routines, or other suitable processing.

The test control function processor 250 may include a processor 252 and a computer-readable memory 254 that stores a structured data processing application 256 and a plurality of test control functions 258 in the form of computer-readable instructions, for example, that may be executable by the processor 252. Computer readable memory 254 may include volatile memory to store computer instructions and data on which the computer instructions operate at runtime (e.g., Random Access Memory or RAM) and, in an embodiment, persistent memory such as a solid state drive or disk drive, for example. In some embodiments, the test control function processor 250 is managed or provided by a third party auditor, but located on the premises of the business. In other embodiments, the test control function processor 250 is managed or provided by the third party auditor and located off the premises of the business, for example, as a cloud-based service.

The test control function processor 250, via execution of the structured data processing application 256, is configured to determine which test control functions of the plurality of test control functions 258 are to be used for generating the audit report 260. In an embodiment, the test control function processor 250 selects the test control functions 258 in response to input from a user (i.e., an auditor), for example, selection of the test control functions individually, selection of a group of test control functions that correspond to a desired audit result, selection of a governmental regulation with which the business seeks to be compliant, or other suitable selection. In another embodiment, the test control function processor 250 automatically based on which fields of the staging database 240 are populated with the structured data. For example, when a required set of data for a test control function is found in the staging database 240, that test control function is automatically selected for execution. The plurality of test control functions 258 are configured to operate on structured data from the staging database 240. As described above, the test control functions are configured to retrieve the structured data from the staging database 240 using only a single request, in some embodiments.

The plurality of test control functions 258 may include multiple different types of functions, for example, universal functions 258A, process-specific or industry-specific functions 258B, or client-specific functions 258C. In various embodiments, the different types of functions provide varying levels of customization for an audit being performed. In the most general case, a universal function 258A provides a test control function that performs a basic task that is applicable to many different businesses, organizations, or entities, for example: i) a user control audit function that verifies user access provisioning, ii) approval authority, iii) separation of duties, iv) account reconciliation, v) system reconciliation, vi) data entry, vii) system access, and other suitable functions. The process-specific functions 258B (or industry-specific functions) are those that are specific to a process that is typically common among many businesses of a particular type, for example: i) general ledger reconciliation, ii) invoice processing, iii) change control, or other suitable functions. Other process-specific functions may relate to one or more of entity-level controls, information technology general controls, controls for managing implementation of new systems, financial reporting (e.g., generating required financial disclosures), revenue and accounts receiving, accounts payable and purchase accounting, human resource management and payroll management, stock compensation management, inventory and fixed asset management, intangible assets, investment management (including equity method investments), debt and tax management.

The client-specific functions 258C are those that are specific to a particular business and may be customized for interfacing with the data stored by that business, for example: i) bank secrecy act/anti-money laundering (BSA/AML) compliance, ii) underwriting approvals, or other suitable functions.

In an embodiment, a universal function 258A is a user access provisioning test control function configured to identify inappropriate user access or privilege to systems, modules, or applications, which could create a weakness or deficiency relative to the business's financial statement assertions, as well as direct risk to business operations. For some businesses, provisioning a new user (i.e., a newly hired employee) requires that a human resources administrator go to an information technology manager, and put in a request for access and provide a reason for that access. The request is documented and routed to a personnel manager, who may review and approve the request, and the approval is transmitted back to the information technology manager, who grants access to the new user. The user provisioning test control function is configured to ensure that this user provisioning process is properly followed, for example, by reviewing data that represents the user provisioning process. Notably, the data that represents the user provisioning process is stored in the staging database 240 so that the test control function does not need to load and analyze the new user request, the approval, etc. In an embodiment, for example, the test control function is configured to obtain a list of users who received access to the system. For each user, the test control function verifies that there was a request opened for this user and that a provided access level is consistent with that requested. The test control function also verifies that the request has a valid approval and that the approval is by an appropriate person (i.e., by the personnel manager instead of the human resources administrator). The test control function may also verify that the approval date occurs on or after the request date, for example, to determine whether an approval has been improperly "backdated."

In another embodiment, a test control function 258 is a feature comparison function configured to provide a template for comparing data elements across two different data sources 202. It can be used to automate a portion of the testing for a large number of test control functions where comparisons are performed, including data entry controls (i.e., manual data entry), inter-system data transfers, and system interface controls. In some scenarios, the feature comparison test function ensures that data that is initially captured in a document or form is then translated into a system of record accurately. As one example, an invoice may have an invoice date, amount, quantity, part number or SKU that must be entered into a data source. The feature comparison function ensures that the data source matches the original document. In some embodiments, the feature comparison function employs an optical character recognition function or analyzes digital metadata included within a data source.

Inappropriate change logs, user access or privilege to systems, modules, or applications can create a weakness or deficiency relative to a business's financial statement assertions, as well as direct risk to business operations. In an embodiment, a test control function 258 is a change control function configured to enable testing of controls related to assessing the necessity, existence, completeness, and timeliness of change control log entries. In another embodiment, a test control function 258 is a user access review function configured to enable the testing of controls related to the management of users on a system. In yet another embodiment, a test control function 258 is a user terminations function configured to enable the testing of controls related to the removal of users. The function tests whether a user was terminated within a given time period of a request for removal, for example.

In another embodiment, a test control function 258 is a record processing and approval function configured to verify that all records are processed and approved prior to a testing date. As an example, approvals may be based on the monetary amount associated with the record, an approval matrix with approval levels based on a monetary amounts, and a listing of approvers with their assigned approval level. This test control function is applicable to invoices, and other monetary-based approvals such as purchase orders, travel and entertainment expenses, and cash receipts.

Unreconciled accounts or reconciliation performed by an unauthorized user can be an indication of fraud/malpractice or data entry errors that should be corrected. In an embodiment, a test control function 258 is a chart of account reconciliation function configured to enable the testing of controls related to the reconciliation of accounts within a source ledger to accounts within a target ledger. As one example, this function is configured to test that approvers were authorized and that account balances match. In some embodiments, this function ensures that configuration and values within a financial reporting software program matches up with an enterprise resource planning software. For example, the function ensures that account balances reconcile, performs test logic related to account rollups where it goes through each account and corresponding sub-accounts and ensures that the balances match and they sum and roll up to the primary account above it. Additionally, the function validates that the data transport in between the source of data (the ERP system) matches with the data that is actually inserted into the financial reports.

In another embodiment, a test control function 258 is a sensitive activity review function configured to enable the matching of access approval and privileges to an approval authority matrix.

In another embodiment, a test control function 258 is an application password parameter review function configured to enable the testing of controls related to the review of password policies for application against a security baseline. This function helps to ensure that weak application passwords are avoided to reduce the risk of unauthorized access. In some embodiments, for example, the application parameter review function is configured to verify that password complexity associated with the business process meets a minimum complexity threshold. In one such embodiment, the application parameter review function is configured to interpret code written in a compiled code language without compiling the code to determine whether the password complexity associated with a business process associated with the code meets the minimum complexity threshold. As an example, a business may have password requirements (i.e., number of characters, use of upper case, use of lower case, use of special characters, etc.). The application password parameters function is configured to analyze the configuration of a software system to ensure that it enforces the proper password requirements, while still allowing for more complex passwords than the minimum requirements.

In another embodiment, a test control function 258 is a developer access function configured to enable the testing of controls related to users that have permission to update a production software system as well as a development software system. As an example, the developer access function reviews the activities that have occurred within the production software system to ensure sure that developers or users are not making changes in that system. This function prevents the users that develop the system from making changes in a live production system.

In yet another embodiment, a test control function 258 is a server backup function configured to determine whether a server or data source backup routine is properly installed and configured.

In an embodiment, a test control function 258 is a role validation function configured to ensure that user roles or user groups are configured with an appropriate level of access. As an example, the role validation function ensures that a trainee user group does not have administrator level access.

In another embodiment, a test control function 258 is a database parameter validation function. As an example, a database has a list of security parameters (e.g., access control, passwords, etc.) and many IT controls or Sarbanes-Oxley regulations require those parameters to be set a certain way to prevent inappropriate access or inappropriate modification of data. In an embodiment, the database parameter validation function has a standard data model with 2 different tables: a first table that stores the parameters and the values associated with those parameters for each database, and a second table that stores those parameters that are needed to test and what the values should be. The database parameter validation function is configured to ensure that the parameters are what they should be and may be executed more frequently than a full audit, so that the parameters are not set inappropriately but then changed to appropriate values just before an audit.

In some embodiments, one or more of the plurality of test control functions 258 are executed locally by the processor 252 of the test control function processor 250. In other embodiments, some of the test control functions 258 are executed remotely by a different processor, for example, the processor 242, the on-site data processor 112, the off-site data processor 122, or another suitable processor.

As described above, at least some of the plurality of test control functions 258 provide basic functionality for auditing a business process. In some embodiments, two or more test control functions are combined to perform an audit of a more complex business process.

In some embodiments, the system 200 is configured to perform validation of the test control functions 258 by utilizing a manual entry of prior audit results. As one example, the staging database 240 receives a manual test result from a prior audit report. The prior audit report includes a manual determination by a user of whether a business process has been properly performed, with the determination being made using prior audit data. The staging database 240 stores the prior audit data that was used by the user to determine whether the business process has been properly performed. The processor 252 executes the test control functions using the prior audit data and generates a confirmation audit report for the test control function. The processor 252 then provides a verification of operation of the test control function based on a comparison of the manual test results with the confirmation audit report. In this way, the test control function is checked against a manual audit by using the same data and comparing the results.

After execution of one or more of the test control functions 258, the processor 252, via execution of the structured data processing application 256, generates the audit report 260. In various embodiments and/or scenarios, the audit report is a text or graphical output that indicates the results of the test control functions 258. In some scenarios, the audit report 260 is provided as a PowerBI report.

Figure 3:
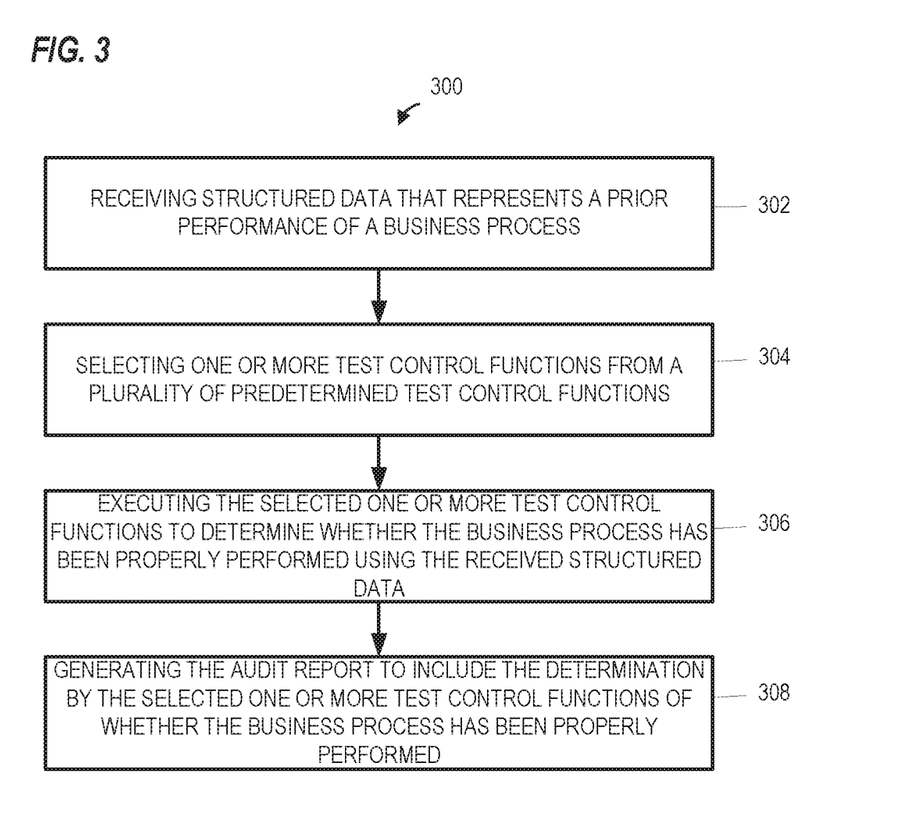
FIG. 3 is a flow diagram of an example method for generating an audit report, according to an embodiment.

FIG. 3 is a flow diagram illustrating an example method 300 for generating an audit report, according to an embodiment. In an embodiment, the method 300 is implemented by a test control function processor 250 in the system 200, according to an embodiment. With reference to FIG. 2, the method 300 is implemented by the processor 252, in an embodiment. For example, in one such embodiment, the processor 252 is configured to implement the method 300 by executing one or more of the structured data processing application 256 and the test control functions 258. In other embodiments, the method 300 is implemented by other suitable processors, network servers, or distributed computing devices. In some embodiments, at least a portion of the method 300 is implemented by the staging database 240. With reference to FIG. 2, the portion of the method 300 is implemented by the processor 242, in an embodiment. For example, in one such embodiment, the processor 242 is configured to implement the method 300 by executing one or more of the structured data storage application 246.

At block 302, structured data that represents a prior performance of a business process is received at a processor from a staging database, in an embodiment. The staging database is configured to receive raw data from a plurality of distinct data sources. In an embodiment, the staging database corresponds to the staging database 240.

At block 304, one or more test control functions are selected by the processor from a plurality of predetermined test control functions, in an embodiment. The plurality of predetermined test control functions are configured to read structured data from the staging database and to process the structured data to determine whether business processes have been properly performed. In an embodiment, the test control functions are automatically selected by the processor based on which fields of the staging database are populated with the structured data. In some embodiments, the test control functions correspond to the plurality of test control functions 258.

At block 306, the selected one or more test control functions are executed by the processor to determine whether the business process has been properly performed using the received structured data, in an embodiment. In some embodiments, the selected test control functions are automatically executed when the structured data is updated at the staging database. In some examples, the one or more test control functions are configured to verify that password complexity associated with the business process meets a minimum complexity threshold. As one such example, the structured data includes code written in a compiled code language that implements the password complexity, and the one or more test control functions are configured to interpret the code written in the compiled code language without compiling the code to determine whether the password complexity associated with the business process meets the minimum complexity threshold.

At block 308, the audit report is generated to include the determination by the selected one or more test control functions of whether the business process has been properly performed.

In some embodiments, the staging database receives the raw data from the plurality of distinct data sources as separate data elements using at least two separate calls to distinct data sources of the plurality of distinct data sources, and the separate data elements are stored in the staging database as the structured data. Moreover, receiving the structured data includes performing a single call to the staging database to request the structured data for the one or more test control functions. In some scenarios, structured data for a single test control function is pulled from multiple distinct data sources.

In an embodiment, the staging database receives data that has been manually entered by a user stores the manually entered data as a portion of the structured data. In another embodiment, the staging database receives data that has been entered using optical character recognition (OCR) and stores the OCR entered data as a portion of the structured data. In some embodiments, at least some of the separate data elements within the staging database are modified after they have been stored in the staging database, but before the execution of the test control functions.

In an embodiment, the staging database receives a manual test result from a prior audit report that includes a determination by a user of whether the business process has been properly performed using prior audit data. The staging database stores the prior audit data and the processor executes the selected one or more test control functions using the prior audit data. The processor generates a confirmation audit report for the selected one or more test control functions and provides a verification of operation of the selected one or more test control functions based on a comparison of the manual test result and the confirmation audit report.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations have been described herein in terms of "modules" or "components," it is noted that that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A method for generating an audit report, the method comprising:
receiving, by a staging database using a structured data storage application, raw data from a plurality of distinct data sources as separate data elements using at least two separate calls to distinct data sources of the plurality of distinct data sources;
storing, in the staging database using the structured data storage application, the separate data elements as structured data having a predetermined format, the structured data including i) first structured data that represents a prior performance of a first password security business process for a first business and includes first uncompiled code that is written in a first compiled code language and implements a first verification of password complexity associated with the first password security business process when compiled and executed, and ii) second structured data that represents a prior performance of a second password security business process for a second business and includes second uncompiled code that is written in a second compiled code language and implements a second verification of password complexity associated with the second password security business process when compiled and executed;
receiving, at a processor and from the staging database, the first structured data and the second structured data;
selecting, by the processor using a structured data processing application, one or more test control functions from a plurality of predetermined test control functions, including
automatically selecting a reusable test control function when a corresponding set of structured data, to be processed by the reusable test control function, is found in the staging database, the plurality of predetermined test control functions being configured to, when executed by the processor, read corresponding structured data from the staging database and process the corresponding structured data to determine whether corresponding business processes have been properly performed, wherein at least some of the plurality of predetermined test control functions are configured to be reused and customized differently for distinct audits, wherein the plurality of predetermined test control functions include a password test control function configured to interpret uncompiled codes to determine whether verification of password complexity as implemented by the uncompiled codes meets corresponding minimum complexity thresholds for password security business processes;

executing, by the processor, the selected one or more test control functions including i) executing the reusable test control function for a first audit to determine whether the first password security business process has been properly performed by the first business using the received first structured data, including executing the password test control function to interpret the first uncompiled code within the first structured data without compiling the first uncompiled code to determine whether the verification of the password complexity as implemented by the first uncompiled code meets the minimum complexity threshold for the first password security business process and ii) executing the reusable test control function for a second audit to determine whether the second password security business process has been properly performed by the second business using the received second structured data, including executing the password test control function to interpret the second uncompiled code within the second structured data without compiling the second uncompiled code to determine whether the verification of the password complexity as implemented by the second uncompiled code meets the minimum complexity threshold for the second password security business process;

generating, by the processor using the structured data processing application, i) a first audit report for the first audit to include the determination by the reusable test control functions of whether the first password security business process has been properly performed by the first business, and ii) a second audit report for the second audit to include the determination by the reusable test control function of whether the second password security business process has been properly performed by the second business.

2. The method of claim 1, wherein receiving the first structured data comprises performing a single call to the staging database to request the first structured data for the selected one or more test control functions.

3. The method of claim 2, wherein the first structured data for the reusable test control function is pulled from distinct data sources.

4. The method of claim 2, the method further comprising:
receiving, by the staging database using the structured data storage application, the raw data as data that has been manually entered by a user; and
storing, in the staging database using the structured data storage application, the manually entered data as a portion of the first structured data.

5. The method of claim 2, the method further comprising:
receiving, by the staging database using the structured data storage application, the raw data as data that has been entered using optical character recognition (OCR); and
storing, in the staging database using the structured data storage application, the OCR entered data as a portion of the first structured data.

6. The method of claim 2, the method further comprising:
modifying, within the staging database using the structured data storage application, at least some of the separate data elements to have the predetermined format after storing the at least some separate data elements.

7. The method of claim 1, the method further comprising:
receiving, at the staging database, a manual test result from a prior audit report that includes a determination by a user of whether the first password security business process has been properly performed using prior audit data;
storing, at the staging database, the prior audit data that was used by the user to determine whether the first password security business process has been properly performed;
executing, by the processor, the reusable test control function using the prior audit data;
generating, by the processor, a confirmation audit report for the reusable test control function;
providing, by the processor, a verification of operation of the reusable test control function based on a comparison of the manual test result and the confirmation audit report.

8. The method of claim 1, the method further comprising automatically executing the reusable test control function when the first structured data is updated at the staging database.

9. A system for generation of an audit report, the system comprising:
a staging database configured to receive raw data from a plurality of distinct data sources; and
one or more processors configured to execute a structured data processing application configured to:
receive, at the one or more processors and from the staging database, structured data that represents a prior performance of a password security business process, the received structured data including uncompiled code that is written in a compiled code language and implements a verification of password complexity associated with the password security business process when compiled and executed;
select, by the one or more processors, one or more test control functions from a plurality of predetermined test control functions, the plurality of predetermined test control functions being configured to read corresponding structured data from the staging database and to process the corresponding structured data to determine whether corresponding business processes have been properly performed, wherein at least some of the plurality of predetermined test control functions are configured to be reused and customized differently for distinct audits and include a password test control function configured to interpret the uncompiled code to determine whether the verification of the password complexity as implemented by the uncompiled code meets a minimum complexity threshold for the password security business process;
execute, by the one or more processors, the selected one or more test control functions for a first audit to determine whether the corresponding business processes have been properly performed using the received structured data, including executing the password test control function to interpret the uncompiled code within the received structured data without compiling the uncompiled code to determine whether the verification of the password complexity as implemented by the uncompiled code meets the minimum complexity threshold for the password security business process; and generate, by the one or more processors, a first audit report for the first audit to include the determination by the selected one or more test control functions of whether the business process has been properly performed.

10. The system of claim 9, wherein the staging database is configured to receive the raw data from the plurality of distinct data sources as separate data elements using at least two separate calls to distinct data sources of the plurality of distinct data sources;
wherein the structured data processing application is configured to:
store, in the staging database, the separate data elements as the structured data that is received at the one or more processors;
perform a single call to the staging database to request the structured data that is received at the one or more processors for the selected one or more test control functions.

11. The system of claim 10, wherein the received structured data includes structured data for a single test control function of the selected one or more test control functions that is pulled from distinct data sources.

12. The system of claim 10, wherein the staging database is configured to receive raw data that has been manually entered by a user; and
wherein the structured data processing application is configured to store, in the staging database, the manually entered data as a portion of the structured data that is received at the one or more processors.

13. The system of claim 10, wherein the staging database is configured to receive raw data that has been entered using optical character recognition (OCR); and
wherein the structured data processing application is configured to:
store, in the staging database, the OCR entered data as a portion of the structured data that is received at the one or more processors.

14. The system of claim 10, wherein the staging database is configured to modify at least some of the separate data elements after storing the at least some separate data elements as the structured data that is received at the one or more processors.

15. The system of claim 9, wherein the staging database is configured to:
receive a manual test result from a prior audit report that includes a determination by a user of whether the password security business process has been properly performed using prior audit data; and
store the prior audit data that was used by the user to determine whether the password security business process has been properly performed;
wherein the structured data processing application is configured to:
execute, by the one or more processors, the password test control function using the prior audit data;
generate, by the one or more processors, a confirmation audit report for the password test control function based on the prior audit data;
provide, by the one or more processors, a verification of operation of the password test control function based on a comparison of the manual test result and the confirmation audit report.

16. The system of claim 9, wherein the structured data processing application is configured to select the one or more test control functions based on which fields of the staging database are populated with the corresponding structured data.

17. The system of claim 9, wherein the structured data processing application is configured to automatically execute the selected one or more test control functions when the corresponding structured data is updated at the staging database.

18. The system of claim 9, wherein the staging database is configured to receive the raw data from the plurality of distinct data sources as separate data elements using at least two separate calls to distinct data sources of the plurality of distinct data sources;
wherein the system further comprises one or more processors configured to execute a structured data storage application configured to store, in the staging database, the separate data elements as structured data having a predetermined format, the structured data including i) first structured data that represents a prior performance of a first business process for a first business, and ii) second structured data that represents a prior performance of a second business process for a second business;
wherein the structured data processing application is further configured to:
automatically select a reusable test control function from the plurality of predetermined test control functions when a corresponding set of structured data, to be processed by the reusable test control function, is found in the staging database, wherein at least some of the plurality of predetermined test control functions are configured to be reused and customized differently for distinct audits;
execute the reusable test control function for a first audit to determine whether the first business process has been properly performed by the first business using the received first structured data;
execute the reusable test control function for a second audit to determine whether the second business process has been properly performed by the second business using the received second structured data;
generate a first audit report for the first audit to include the determination by the reusable test control functions of whether the first business process has been properly performed by the first business;
generate a second audit report for the second audit to include the determination by the reusable test control function of whether the second business process has been properly performed by the second business.

* * * * *